United States Patent
Jang et al.

(10) Patent No.: US 11,669,775 B2
(45) Date of Patent: Jun. 6, 2023

(54) SYSTEM AND METHOD FOR DETECTING A TARGET OBJECT

(71) Applicant: SAMSUNG SDS CO., LTD., Seoul (KR)

(72) Inventors: Sung Ho Jang, Seoul (KR); Jae Young Park, Seoul (KR); Seol Ki Kim, Seoul (KR); Kyung Jun An, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 425 days.

(21) Appl. No.: 17/067,196

(22) Filed: Oct. 9, 2020

(65) Prior Publication Data

US 2021/0357807 A1 Nov. 18, 2021

(30) Foreign Application Priority Data

May 18, 2020 (KR) .................. 10-2020-0058888

(51) Int. Cl.
*G06N 20/00* (2019.01)
*G06F 40/279* (2020.01)
*G06F 11/36* (2006.01)
*G06F 11/34* (2006.01)
*G05B 15/02* (2006.01)

(52) U.S. Cl.
CPC ......... *G06N 20/00* (2019.01); *G06F 11/3476* (2013.01); *G06F 11/3604* (2013.01); *G06F 40/279* (2020.01); *G05B 15/02* (2013.01)

(58) Field of Classification Search
None
See application file for complete search history.

(56) References Cited

U.S. PATENT DOCUMENTS

| 2018/0101582 | A1* | 4/2018 | Libby | G06F 16/44 |
|---|---|---|---|---|
| 2019/0384699 | A1* | 12/2019 | Arbon | G06N 3/006 |
| 2020/0327005 | A1* | 10/2020 | Singh | G06V 30/19173 |
| 2021/0103798 | A1* | 4/2021 | Neagovici | G06V 10/764 |
| 2021/0200387 | A1* | 7/2021 | Munteanu | G06F 9/451 |

* cited by examiner

*Primary Examiner* — Isaac Tuku Tecklu
(74) *Attorney, Agent, or Firm* — The PL Law Group, PLLC

(57) ABSTRACT

A target object detection method performed by a computing device includes detecting a first target object on a user screen and obtaining a bot executable file to perform a defined operation for the first target object, labelling object type classification criteria for the first target object by encoding detection criteria information of the first target object included in the bot executable file, extracting a characteristic of process execution information of the first target object included in the bot executable file, and generating an object classification model that outputs data on an object type corresponding to process execution information by performing machine learning using the object type classification criteria and the characteristic.

20 Claims, 13 Drawing Sheets

FIG. 5

| PROPERTY | | |
|---|---|---|
| 31 — Activity | | |
| 31a — Index | X 43 | Y 7 |
| Click Point | True | |
| Check Name | True | False |
| Check Value | True | False |
| Check Size | | |
| 33 — Target | | |
| 33a — Application* | iexplore | |
| 33b — Title | "Knox Portal - Internet Explorer" | |
| 33c — Type | Button | |
| 33d — Name* | 'SDS - Knox Portal' | |
| Value* | " | |

FIG. 6

PROCESS EXECUTION INFORMATION

```
<Process id="P1" type="process" workType="foreground" name="MyProcess" ... >
  <Steps>
    <Step id="S1" ver="191211001" type="Win" name="Click" apptitle="Knox Portal - Internet Explorer" tag="" depth="1" ...>
      <Property type="Win" key="Application_PID" ... value="19328" />
      <Property type="Win" key="Application_ProcessName" ... value="iexplore" />
      <Property type="Win" key="Application_Title" ... value="Knox Portal - Internet Explorer" />
      <Property type="Win" key="Application_ClassName" ... value="IEFrame" />
      <Property type="Win" key="Application_ClassType" ... value="Window" />
      <Property type="Win" key="Application_WindowHandle" ... value="10096310" />
      <Property type="Win" key="Target_AutomationID" ... value="menu-4300019" />
      <Property type="Win" key="Target_FrameworkID" ... value="InternetExplorer" />
      <Property type="Win" key="Target_ClassName" ... value="" />
      <Property type="Win" key="Target_ClassType" ... value="Hyperlink" />
      <Property type="Win" key="Target_Name" ... value="메일" />
      <Property type="Win" key="Target_ObjectPath" ... value="Window||EFrame||Win32/Pane|Frame Tab|| ... " />
      <Property type="Win" key="Target_Value" ... value="javascript:void(0);" />
    <Step/>
    ...
    <Step id="S2" ver="191211001" type="Win" name="Click" apptitle="Login" tag="" depth="1" ...>
  <Steps/>
<Process/>
```

(41a, 41b, 41c)

OBJECT DETECTION RESULT

```
<Result id="P1" name="winLibrary_explorer_test" result="Pass" start="2020-03-05T01:57:48" end="2020-03-05T01:58:23" jobId="J1">
  <Step id="S1" type="Win" name="Click" result="Pass" start="2020-03-05T01:57:55" end="2020-03-05T01:57:57">
    <SearchResult result="Sucess" tryCount="1" appFilter="Active" appCount="2" searchMethod="TopDown" candidateCount="6" targetFilter="Name" />
  </Step>
  <Step id="S2" type="Win" name="Click" result="Pass" start="2020-03-05T01:57:57" end="2020-03-05T01:58:04">
    <SearchResult result="Sucess" tryCount="1" appFilter="Active" appCount="2" searchMethod="TopDown" candidateCount="2" targetFilter="Value" />
  </Step>
  ...
</Result>
```

```
<Process id="P1" type="process" workType="foreground" name="MyProcess" ... >
  <Steps>
    <Step id="S1" ver="191211001" type="Win" name="Click" apptitle="Knox Portal - Internet Explorer" tag="" depth="1" ...>
      <Property type="Win" key="Application_PID" ... value="19328" />
      <Property type="Win" key="Application_ProcessName" ... value="iexplore" />
      <Property type="Win" key="Application_Title" ... value="Knox Portal - Internet Explorer" />
      <Property type="Win" key="Application_ClassName" ... value="IEFrame" />
      <Property type="Win" key="Application_ClassType" ... value="Window" />
      <Property type="Win" key="Application_WindowHandle" ... value="10096310" />
      <Property type="Win" key="Target_AutomationID" ... value="menu-4300019" />
      <Property type="Win" key="Target_FrameworkID" ... value="InternetExplorer" />
      <Property type="Win" key="Target_ClassName" ... value="" />
      <Property type="Win" key="Target_ClassType" ... value="Hyperlink" />
      <Property type="Win" key="Target_Name" ... value="ID" />
      <Property type="Win" key="Target_ObjectPath" ... value="Window||IEFrame||Win32/Pane||Frame Tab|| ... " />
      <Property type="Win" key="Target_Value" ... value="javascript:void(0);" />
    <Step/>
    <Step id="S2" ver="191211001" type="Win" name="Click" apptitle="Login" tag="" depth="1" ...>
    ...
  <Steps/>
```

| Process ID | Step ID | Type | Name | App-Title | Application_ProcessName | ... | Target_Name | Target_ObjectPath | ... |
|---|---|---|---|---|---|---|---|---|---|
| P1 | S1 | Win | Click | Knox Portal - Internet Explorer | iexplore | ... | ID | "Window||IEFrame||Win32/Pane||Frame Tab|| ... | ... |
| P1 | S2 | Win | Click | Login | iexplore | ... | Login | "Window||IEFrame||Win32/Pane||Frame Tab|| ... | ... |
| ... | ... | ... | ... | ... | ... | ... | ... | ... | ... |

51    53    55    56

FIG. 9
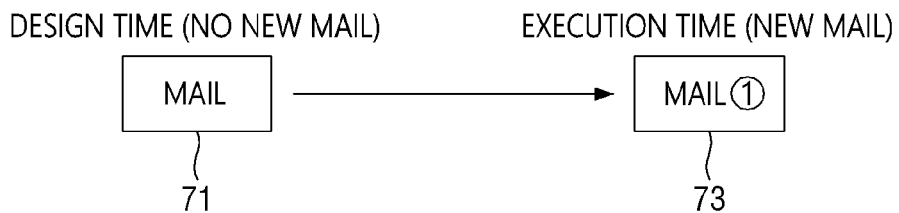
FIG. 10A
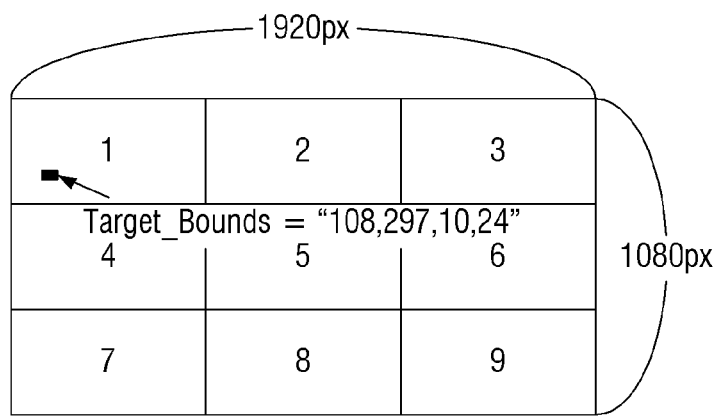
FIG. 10B
| Range | Very Small | Small | Medium | Large | Very Large |
|---|---|---|---|---|---|
| Width * height | ≤500 | ≤1000 | ≤3000 | ≤5000 | >5000 |

SYSTEM AND METHOD FOR DETECTING A TARGET OBJECT

CROSS-REFERENCE TO RELATED APPLICATIONS

This patent application claims the benefit of Korean Patent Application No. 10-2020-0058888, filed on May 18, 2020, which is hereby incorporated by reference in its entirety into this application.

BACKGROUND

1. Field

The inventive concept relates to a method and apparatus for detecting a target object on a user screen. More specifically, it relates to a method and apparatus for detecting a target object on a user screen by generating an object classification model that outputs data on an object type corresponding to process execution information.

2. Description of the Related Art

Task automation technology such as robotic process automation (RPA) technology is provided. As an element technology required for such a task automation technology, a technology for identifying a target object required for performing a task on various user screens is required.

Robotic process automation uses a bot that imitates human activity to automatically process repetitive tasks that should be handled by workers. User activity that the bot imitates means the user's actions applied to the target object on the user screen, that is, the UI (i.e., user interface) through the user input device. For example, a target object is selected for performing repetitive tasks within the user's screen, such as clicking a button on the screen using a mouse or entering a value using a keyboard in a text input window, and a user activity for that is performed.

Therefore, the technical problem of robot process automation is to detect a target object, on which a user's mouse/keyboard operation is performed.

However, the conventional robot process automation technology has difficulty in detecting a target object among a large number of UI objects on a screen. For a specific example, the criteria for detecting may vary according to a user situation, a target application program, a target object type, and the like. Accordingly, there is a problem in that the number of attempts to detect an object and the time required increase, thereby deteriorating the efficiency of task automation.

Specifically, the conventional robot process automation technology attempts detection by sequentially applying a detection rule according to a predetermined priority before executing the bot, so there is a problem in a large deviation in the success probability of detection according to the set detection rule and target object type, etc. Since conventional robot process automation technology applies the same detection rules sequentially to the target objects, if the detection rules are not properly set, there is a problem in unnecessary target object detection processes are repeatedly performed, and accordingly, the detection time becomes longer, thereby deteriorating work efficiency. Further, there is a problem in that an object on the user screen cannot be detected when the detection rule is incorrectly set.

SUMMARY

The technical problem to be solved by the inventive concept is to provide a method for recommending an identification element for each object defined in the design process of an automation target process and a device to which the method is applied.

Another technical problem to be solved by the inventive concept is to provide a method and apparatus for determining an optimal identification element to be referred to when identifying an object located on a user screen in an execution process of an automation target process.

Another technical problem to be solved by the inventive concept is to provide a method and apparatus for generating an artificial intelligence-based model for determining an optimal identification element to be referred to when identifying an object on a user screen.

Another technical problem to be solved by the inventive concept is to provide a method and apparatus for advancing RPA technology based on an artificial intelligence-based model that determines an optimal identification element to be referred to when identifying an object on a user screen.

Another technical problem to be solved by the inventive concept is to provide a method and apparatus for minimizing repetition of an unnecessary object detection process.

Another technical problem to be solved by the inventive concept is to provide a method and apparatus for reducing the time for performing robot process automation technology by improving the object detection success rate.

Another technical problem to be solved by the inventive concept is to provide a method and apparatus for increasing a robot process automation task throughput.

The technical problems of the inventive concept are not limited to the technical problems mentioned above, and other technical problems not mentioned will be clearly understood by a person skilled in the art from the following description.

According to an embodiment of the present disclosure, a target object detection method performed by a computing device includes detecting a first target object on a user screen and obtaining a bot executable file to perform a defined operation of the first target object, labelling object type classification criteria for the first target object by encoding detection criteria information of the first target object included in the bot executable file, extracting a characteristic of process execution information of the first target object included in the bot executable file, and generating an object classification model that outputs data on an object type corresponding to process execution information by performing machine learning using the object type classification criteria and the characteristic.

According to an embodiment of the present disclosure, a target object detection method performed by a computing device includes detecting a first target object on a user screen and obtaining an execution log generated in a process of performing a defined operation, labelling object type classification criteria by encoding detection criteria information of the first target object included in the execution log, extracting a characteristic of process execution information of the first target object included in the execution log, and generating an object classification model that outputs data on an object type corresponding to process execution information of a target object by performing machine learning using the object type classification criteria and the characteristic.

According to an embodiment of the present disclosure, a target object detection apparatus includes a processor, a network interface, a memory and a computer program loaded into the memory and executed by the processor, wherein the computer program includes an instruction for detecting a first target object on a user screen and obtaining a bot executable file for performing a defined operation for the first target object, an instruction for labelling object type classification criteria for the first target object by encoding the detection criteria information of the first target object included in the bot executable file, an instruction for extracting a characteristic of process execution information of the first target object included in the bot executable file, and generating an object classification model that outputs data on an object type corresponding to process execution information by performing machine learning using the object type classification criteria and the characteristic.

BRIEF DESCRIPTION OF THE DRAWINGS

FIG. 5 is a diagram for describing process execution information that can be referred to in some embodiments of the inventive concept;

FIG. 6 is a diagram for describing a bot executable file and an execution log that can be referred to in some embodiments of the inventive concept;

FIG. 7 is a diagram for describing in detail some operations of the target object detection method described with reference to FIG. 4 where process execution information and preprocessed data are illustrated;

FIG. 9 is another diagram for describing in detail some operations of the target object detection method described with reference to FIG. 4;

FIG. 10A is an object location information example for describing in detail some operations of the target object detection method described with reference to FIG. 4;

FIG. 10B is an object size category example for describing in detail some operations of the target object detection method described with reference to FIG. 4;

DETAILED DESCRIPTION

Figure 1:
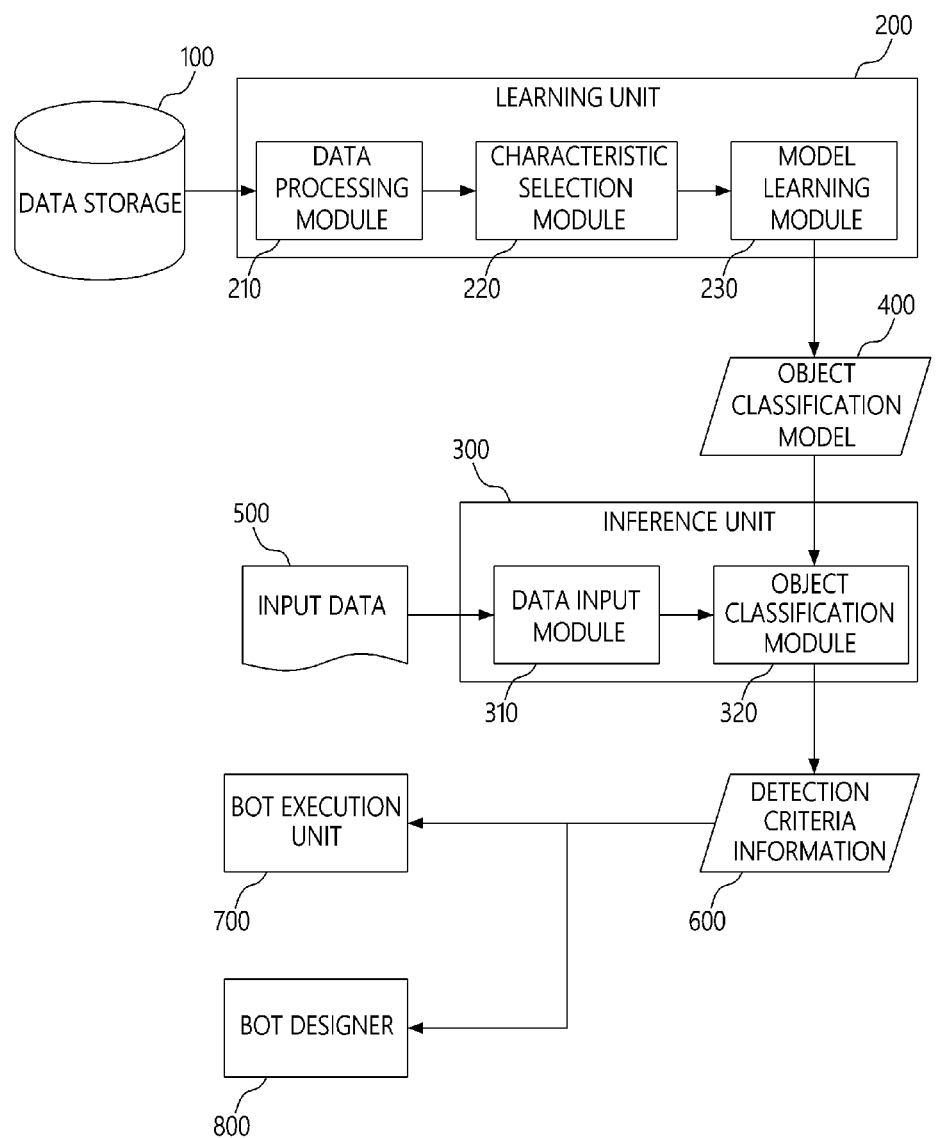
FIG. 1 is a diagram for describing a target object detection system according to an embodiment of the inventive concept.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) nay be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

Hereinafter, a configuration and operation of a target object detection system according to an embodiment of the inventive concept will be described with reference to FIG. 1. FIG. 1 is a block diagram of a target object detection system according to the present embodiment.

The target object detection system according to the present embodiment may be understood as a system that outputs reference information for detecting a target object located on a user screen. The user screen may refer to a screen displayed through a display device or a screen output from a virtual desktop or virtual machine. The target object may refer to various GUI elements included in the user screen. For example, the target object may refer to an icon of a desktop, a button of a program, a link, or the like.

FIG. 1 is a diagram for describing a target object detection system according to an embodiment of the inventive concept. Each of the components of the target object detecting system illustrated in FIG. 1 represents functionally divided functional elements, and any one or more components may be implemented by being integrated with each other in an actual physical environment.

Referring to FIG. 1, the target object detection system may include a data storage 100, a learning unit 200, an inference unit 300, a bot execution unit 700 and a bot designer 800. Hereinafter, each component will be described in detail.

The data storage 100 may store a bot executable file and an execution log. Furthermore, the data storage 100 may transmit the bot executable file and execution log to the learning unit 200.

Here, the data storage 100 may be an external storage such as a database server or network file storage. In addition, it may be an internal storage medium such as an HDD (hard disk drive), SSD (solid state drive), or the like. However, the present invention is not limited thereto, and may be a cloud service. The cloud service refers to an on-demand outsourcing service that provides various IT (information technology) resources such as servers, storage, and software to users. For example, the cloud service that provides storage is a service that allows a user to store various data in the storage of a service providing server connected to a network and download it through a network when necessary. The cloud service may be an infrastructure as a service (IaaS) capable of providing a virtualized infrastructure environment to a user or a software as a service (SaaS) providing application software through the Internet, but is not limited thereto. The data storage 100 may include all components capable of storing data and transmitting the data to the learning unit 200.

Here, the bot executable file may mean software that allows the bot to perform repetitive tasks performed by a human by imitating user activity. Generally, the bat executable file can be generated using a robot process automation design tool. However, the present invention is not limited thereto, and the bat executable file may be generated using a user activity recording tool. Further, bot executable file should be understood to refer to any form of interpretable data or executable data that defines a process (which can be expressed in terms of tasks, jobs, etc.) in a predetermined way that can be performed on behalf of a human in order to automate tasks, for example, may be a file that runs according to RPA technology.

A diagram for describing process execution information will be described with reference to FIG. 5.

FIG. 5 is a diagram for describing process execution information that can be referred to in some embodiments of the inventive concept.

The bot executable file may include process execution information.

Referring to FIG. 5, an example screen of a robot process automation design tool for designing process execution information for each step is illustrated. The robot process automation design tool can set user activity 31 property information for each process step. For example, the sellable user property information may include user activity such as clicks 31a. However, the present invention is not limited thereto, and the user activity such as text input may also be included, and all repetitive tasks performed by the user may be included.

Further, the robot process automation design tool can set various property information about the target application program and the target object 33. For example, property information 33a, 33b about the application program can be set. Also, property information 33c and 33d regarding the target object can be set.

Referring to FIG. 5, the user activity property information, application program property information, and target object property information included in the briefly introduced process execution information will be embodied by some embodiments to be described later.

Here, the execution log means a log that detects a target object on a user screen and performs a defined operation. The execution log may include step-by-step process execution information and history of detection success/failure for step-by-step process execution. The detection history includes the final detection history for the target object, and the final detection history may include information such as the number of detection attempts, the number of detection targets, and the detection criteria item. This will be described again with reference to FIG. 1.

Referring to FIG. 1, the learning unit 200 will now be described. The learning unit 200 may include a data processing module 210, a characteristic selection module 220, and a model learning module 230.

The learning unit 200 may receive a bot executable file or an execution log from the data storage 100 and convert process execution information into a form learnable by artificial intelligence. Further, the learning unit 200 may label the object type classification criteria by receiving the bot executable file or the execution log from the data storage 100. Further, the learning unit 200 may receive a bot executable file or an execution log from the data storage 100 and extract characteristics of the process execution information. Furthermore, the learning unit 200 may generate an object classification model that receives a bot executable file or an execution log from the data storage 100 and output a probability value of belonging to an object type corresponding to process execution information.

The data processing module 210 may perform a role of receiving a bot executable file or an execution log from the data storage 100 and preprocess data in a form for inputting it into model learning module 230 by artificial intelligence. For example, the data processing module 210 may process a missing value of data. Further, the data processing module 210 may perform data normalization. Further, the data processing module 210 may perform data whitening. However, the present invention is not limited thereto, and all preprocessing methods for performing supervised learning of machine learning may be performed. The method performed in the data processing module 210, which may be referred to in some embodiments of the inventive concept, will be embodied later with reference to FIGS. 2-14.

The data processing module 210 may divide and manage the input data into learning data and evaluation data. The ratio of data can be adjusted at the learning stage according to the amount of input data, data balance, and the like.

The characteristic selection module 220 may serve to generate data for being input to the model learning module 230. The characteristic selection module 220 may generate a characteristic vector using process execution information included in a bot executable file or an execution log. Further, the characteristic selection module 220 may automatically label object type classification criteria by encoding detection criteria information included in a bot executable file or an execution log. Furthermore, the characteristic selection module 220 may be labeled to the model learning module 230 and transmit the generated data. The method performed in the characteristic selection module 220 that may be referred to in some embodiments of the inventive concept will be specified later with reference to FIGS. 2 to 14.

The model learning module 230 may generate an object classification model that outputs a probability value of belonging to an object type corresponding to process execution information by artificial intelligence learning using the input data 500. More specifically, the model learning module 230 may classify object types corresponding to process execution information included in the input data 500 and generate an object classification model outputting a probability value corresponding to detection criteria information for detecting the object types. Further, the model learning module 230 may evaluate the learned results. Furthermore, the model learning module 230 may transmit the object classification model 400 generated through learning and evaluation to the inference unit 300.

The model learning module 230 may include machine learning and deep learning models that can be generally used to solve classification problems. The method performed in the model learning module 230, which may be referred to in some embodiments of the inventive concept, will be specified later with reference to FIGS. 2-14.

Next, the inference unit 300 may include a data input module 310 and an object classification module 320.

The inference unit 300 may receive the input data 500. Here, the input data 500 may be a bot executable file, however the present invention is not limited thereto, and may instead be step-by-step process execution information input from the bot designer device 800 and received by the inference unit 300. Further, the inference unit 300 may preprocess the input data 500. Further, the inference unit 300 may output a probability value of belonging to an object type corresponding to process execution information by artificial intelligence learning using the input data 500. More specifically, the model learning module 230 may classify object types corresponding to process execution information included in the input data 500 and output a probability value corresponding to the detection criteria information 600 for detecting the object type. Furthermore, the inference unit 300 may set the detection criteria information 600.

The data input module 310 may perform operations similar to the data processing module 210 and the characteristic selection module 220 of the learning unit 200 described above. More specifically, the data input module 310 may receive the input data 500, may preprocess the input data 500, extract characteristics of process execution information included in the input data 500, and transmit it to the object classification module 320. The method performed in the data input module 310, which may be referred to in some embodiments of the inventive concept, will be embodied later with reference to FIGS. 2-14.

The object classification module 320 may receive the object classification model 400 generated by the learning unit 200. Further, the object classification module 320 may receive characteristics extracted from process execution information transmitted by the data input module 310.

The object classification module 320 may classify an object type corresponding to the process execution information, and output a probability value corresponding to the detection criteria information 600 for detecting the object type. Further, the object classification module 320 may set the detection criteria information 600. The method performed in the object classification module 320, which may be referred to in some embodiments of the inventive concept, will be embodied later with reference to FIGS. 2-14.

The set detection criteria information 600 may be transmitted to the bot execution unit 700. It can also be sent to the bot designer device 800. However, the present invention is not limited thereto, and may not transmitted to the bot designer device 800 in the design process, and may be automatically reflected in step-by-step process execution information.

Next, the bot execution unit 700 means a device that executes a bot that performs a repetitive task performed by a human by imitating a user's activity. The set detection criteria information 600 is transmitted to the bot execution unit 700, so that detection criteria for dynamically detecting a target object may be provided.

Next, the bot designer device 800 means a device for designing a bot. The set detection criteria information 600 is transmitted to the bot designer device 800, so that detection criteria for dynamically detecting a target object may be provided.

The bot execution unit 700 or the bot designer device 800 according to an embodiment of the inventive concept may be, for example, any one of a desktop, a workstation, a server, a laptop, a tablet, a smart phone, or a phablet, but is not limited thereto, may be a device such as a portable multimedia player (PMP), personal digital assistants (PDA) or an E-book reader. However, the present invention is in no way limited thereto.

Figure 4:
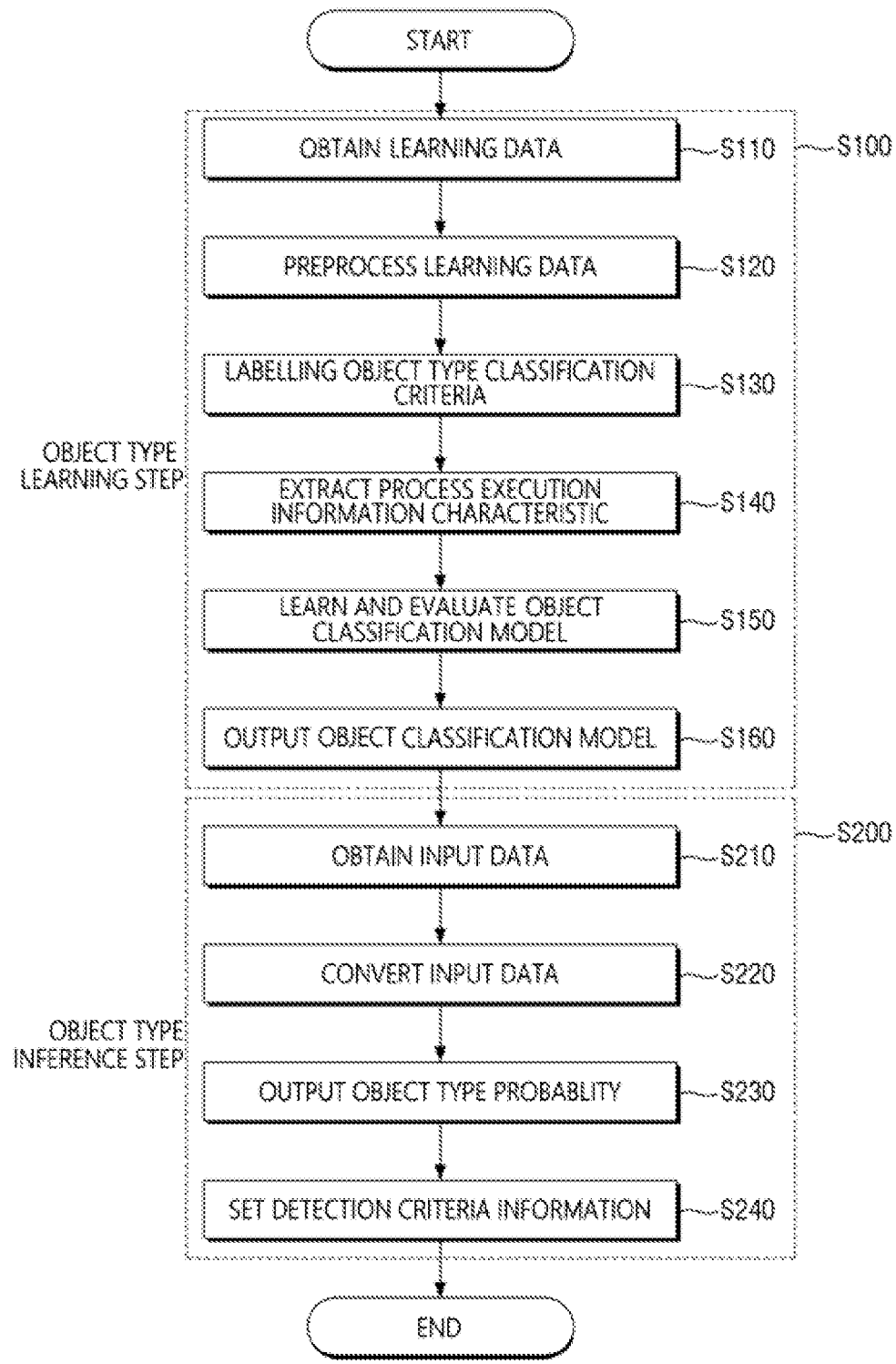
FIG. 4 is a flowchart of a target object detection method according to another embodiment of the inventive concept.

Hereinafter, a method of detecting a target object according to another embodiment of the inventive concept will be described with reference to FIG. 4. The target object detection method according to the present embodiment may be performed by a computing device. Further, the method according to the present embodiment may be performed by being divided into a first computing device and a second computing device. Hereinafter, in performing each operation of the method according to the present embodiment, if the description of the subject is omitted, it may be interpreted that the subject is the computing device.

In step S100, a model for classifying object types based on artificial intelligence is learned. Step S100 may be performed in the learning unit 200 described with reference to FIG. 1. Hereinafter, steps included within step S100 will now be described in order.

In step S110, learning data are obtained. The learning data can be a bot executable file or an execution log as described above. For a detailed description of this, it will be described with reference to FIG. 6.

FIG. 6 is a diagram for describing a bot executable file and an execution log that may be referred to in some embodiments of the inventive concept. Referring to FIG. 6, process execution information and object detection results (detection history) are shown. In one embodiment, the process execution information may include at least one of user activity property information, target application program property information and object property information.

Referring to the process execution information in FIG. 6, user activity property information 41a is shown in step S141. Further, the target application program property information 41b is shown. Furthermore, object property information 41c is also shown. For example, process execution information includes user activity property information (name, apptitle, tag, depth, etc.), target application property information (Application_PID, Application_ProcessName, Application_Title, etc.) and target object property information (Target_Name, Target_Value, Target_Class Name, Target_Object Path). However, the inventive concept is not limited to this example.

Referring to the object detection result (detection history) of FIG. 6, in step S1 41, a detection criteria item 41d that is successfully detected is shown. Further, in step S2 43, a detection criteria item 43a that is successfully detected is shown. The detection criteria items 41d and 43a will be specified by some embodiments to be described later.

The detection history may include a detection result for each execution step, a number of attempts (tryCount), a number of similar objects (candidateCount) and a detection criteria (targetFilter), etc. The inventive concept is not limited to the example described with reference to FIG. 6, and all log formats such as an application program log and a web log may be included.

It will be described again with reference to FIG. 4.

Next, in step S120, the learning data is preprocessed. In learning by the model learning module 230, data having no discrimination power or unnecessary data may be removed. By removing the data having no discrimination power or unnecessary data, it is possible to increase the efficiency of learning performed by the model learning module and suppress the increase in unnecessary management cost.

In one embodiment, when it is determined that a missing value is generated in any one of process execution information, a default value may be assigned to the process execution information, in which the missing value is generated. For example, a special value such as −1 or NaN indicating that there is no data can be assigned in the form of a Boolean. Further, a predetermined reference value can be assigned. Even if a missing value is generated in the process execution information, it can be used as learning data of the model learning module.

In one embodiment, any one of process execution information may be removed according to a criteria rule. For example, a mouse pointer position or size tolerance, which has no discriminating power or is unnecessary data, may be removed. However, it is not limited thereto. For another example, data that appears only once or rarely appears, such as a window handle ID or an application ID, may be removed. For a detailed description of the preprocessing, FIG. 7 will be referred to.

FIG. 7 is a diagram for describing in detail some operations of the target object detection method described with reference to FIG. 4.

Referring to FIG. 7, process execution information and preprocessed data are shown. According to the method described above, process execution information for each step 51 is preprocessed. The preprocessed process execution information may include user activity property information 53, application program property information 55, and target object property information 56. According to the above-described method, it is possible to increase the efficiency of learning performed by the model learning module, and to be preprocessed with data that can suppress an increase in unnecessary management cost. However, the inventive concept is not limited to this example. It will be described again with reference to FIG. 4.

Next, in step S130, the object type classification criteria are labeled. Classification criteria may vary depending on the type of learning data. For example, the classification criteria may be changed according to the bat executable file or execution log.

In one embodiment, detection criteria information corresponding to a rule for detecting a target object may be information, in which at least or lore of the plurality of detection criteria items are selected, and the object type classification criteria may be automatically labeled by multi-hot encoding the selected detection criteria items.

In one embodiment, the detection criteria information may be information, in which any one of a plurality of detection criteria items is selected, and the object type classification criteria may be automatically labeled by one-hot encoding the selected detection criteria item.

In one embodiment, the detection criteria information may be information, in which any one of a plurality of detection criteria item is selected, and the object type classification criteria is automatically labeled by label encoding the selected detection criteria item.

When the selected detection criteria items are plural, it is regarded as a multi-label classification problem and can be labeled in the form of multi-hot encoding. On the other hand, when the selected detection criteria item is singular, it can be regarded as a single-label classification problem and labeled in a label encoding form. Multi-hot encoding, one-hot encoding, and label encoding are obvious to those skilled in the robot process automation field, and a detailed description thereof is omitted.

In the object detection method according to the inventive concept, information included in the learning data is automatically labeled, so that a separate label allocation process performed by a human for machine learning is not required.

Figure 8:
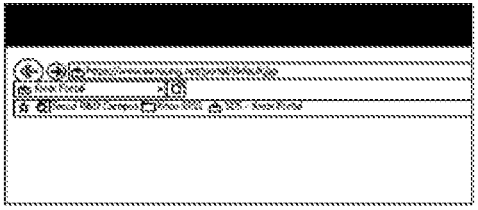
FIG. 8 illustrates an example screen of a robot process automation design tool for designing process execution information.

For a detailed description of the labelling, FIG. 8 will be referred to.

FIG. 8 is a diagram for describing in detail some operations of the target object detection method described with reference to FIG. 4.

Referring to FIG. 8, an example screen of a robot process automation design tool for designing process execution information is illustrated. The user may set 61 the detection criteria information. According to this example, a detection criteria item set (True) as detection criteria is 'Check Name.' As a matter of the multi-property classification described above, the object type classification criteria 63 labeled in the multi-hot encoding form is shown. However, the inventive concept is not limited to this example.

FIG. 6 is referred to again for a detailed description of the labelling.

Referring to FIG. 6, an object detection result (history) is shown. For example, when the execution log is used as learning data, the detection success history may be used for labelling as in this example. According to this example, 'Name' or 'Value', which are successful detection criteria items 41*d* and 43*a*, are used for labelling. As a matter of the single property classification described above, the label is encoded, so that step S1 41 can be labeled as 'Name' and step S2 43 can be labeled as 'Value.' It will be described again with reference to FIG. 4.

In step S140, the characteristic of the process execution information is extracted.

In one embodiment, a characteristic vector including process execution information may be generated. Therefore, the characteristic vector can be expressed as follows.

$$V=[a_1, \ldots, a_l, p_1, \ldots, p_m, o_1, \ldots, o_n]$$

Referring to this formula, a is the extracted characteristic related to the user activity property, 1 is the number of extracted user activity property related characteristics, p is the extracted application property related characteristics, m is the number of the extracted application property related characteristics, o is the extracted target object property related characteristics, and n is the number of extracted object property related characteristics. The process execution information is recorded in various forms such as categorical, numeric, and coordinate types, and can be encoded as a vector through a characteristic extraction step.

For example, with respect to user activity property information, an activity type, an activity name and an activity owner may be extracted. For example, with respect to application property information, an application class type (Application_Classtype), an application program process name (Application_ProcessName), an application program class name (Application_ClassName), and the like may be extracted. For example, in relation to object property information, an object class type (Target_ClassType), an object name (Target_Name), an object value (Target_Value), an object path (Target_ObjectPath), and object coordinates (Target_Bounds) may be extracted.

Further, in the characteristic extraction process, a new characteristic composed of linear combinations of several single property information may be generated and extracted using a dimension reduction technique such as principal component analysis in addition to the single property information mentioned above
, however the present invention is not limited to this example.

In one embodiment, the step of extracting the characteristic includes extracting the characteristic by encoding based on a category corresponding to the text when it is determined that any one of the process execution information of the first target object is categorical text data. The categorical text data can be extracted by one-hot encoding. For example, in the case of an activity type, it is categorical text data that can be declared as one of "Win," "Web," and "Desktop." According to the information in this example, it may be encoded as one of 100, 010, and 001. As in this example, the number of encoding bits for the categorical data is determined according to the number of categorical types.

In the case of data that is variable according to a situation other than categorical text data, it cannot be a suitable criteria item for detecting a target object. FIG. 9 will be referred to for a detailed description.

FIG. 9 is a diagram for describing in detail some operations of the target object detection method described with reference to FIG. 4.

Referring to FIG. 9, it is assumed, for example, that a process performed by a hot clicks on a text button 71 whose object name data is 'mail.' In the case of the text button, whenever new mail arrives, it is changed to a text button 73 that is 'mail+number of new mails.' That is, since the object name is variable depending on the situation, there is a high probability that the object name at design time and execution time are different. In this case, the object should be detected by other detection criteria item than the object name. By generating an object classification model, data that is variable according to a situation other than categorical text data according to an object type may be removed from a detection criteria item when detecting the object by pre-learning.

However, even if it is not categorical text data, it can be extracted and encoded as a characteristic, in one embodiment, the step of extracting the characteristic may include generating a category according to a criteria vile: and extracting the characteristic by encoding based on the category corresponding to text when it is determined that any one of the process execution information of the first target object is not categorical text data.

Even if it is not categorical data, the characteristics can be extracted and encoded according to the criteria rules. By extracting and encoding the characteristics according to the criteria rules, it is possible to prevent a problem of a decrease in learning efficiency and an increase in management cost caused by reflecting all text, not categorical data. A detailed description of the criteria rule will be described later.

In one embodiment, generating the category according to the criteria rule may include detecting a target object on a user screen and obtaining a plurality of execution logs that perform a defined operation, and generating the category based on a main keyword obtained above a reference value from the text of the process execution information by using the process execution information of the target object included in the plurality of execution logs, and extracting the characteristic may include encoding based on the category corresponding to the main keyword included in the text of the first target object.

By performing encoding on the main keyword, data other than categorical text data can be treated as categorical text data. For example, by extracting main keywords in object name data of a process, in which a detection history is occurred, a category can be generated based on keywords that have occurred more than a reference number of times. However, it is not limited thereto.

In one embodiment, generating the category based on the main keyword obtained above the reference value includes generating a first category that does not include the main keyword, and extracting the characteristic includes encoding based on the first category when it is determined that the main keyword is not included in the text of the first target object.

If the category is excessively generated, the number of characteristic dimensions increases, which reduces learning efficiency and creates a risk of operating with noise. Therefore, only main keywords recorded for a predefined number of times or more can be generated as a category, and the rest can be encoded by dividing them into, for example, "Others" categories. By extracting characteristics by encoding the text obtained below the reference number into the first category, occurrence of learning errors can be prevented and detection discrimination power can be increased through balanced data distribution between categories.

In one embodiment, generating the category according to the criteria rule may include converting the text into a regular expression pattern and generating the category based on the similarity of the regular expression pattern.

The method of converting text into a regular expression pattern is obvious to those skilled in the robot process automation field, and a detailed description is omitted. By generating a category based on the similarity of text converted to a regular expression pattern, it is possible to encode and extract characteristics of data that is not categorical text.

In one embodiment, the step of extracting the characteristic may include dividing the screen to generate a category based on the location coordinates included in the divided screen and extracting the characteristic by encoding based on the category corresponding to the location coordinates when it is determined that any one of process execution information of the first target object s location coordinates data.

FIGS. 10A and 10B are referred to for a detailed description of this.

FIGS. 10A and 10B are diagrams for describing in detail some operations of the target object detection method described with reference to FIG. 4.

More specifically, FIG. 10A is an object location information example and FIG. 10B is an object size category example. Referring to FIG. 10A, the object coordinate data includes object location coordinates (x, y). The screen is divided into regions according to location coordinates (for example, 4 divisions, 9 divisions, 16 divisions), and then it is encoded by a screen region including location coordinates to extract object location coordinate data as a characteristic. In this case, the target object included in the '1' area of the divided screen may be encoded as '100000000.'

In one embodiment, the step of extracting the characteristic may include generating a category by dividing it into a plurality of size sections having a range according to a criteria rule, and extracting the characteristic by encoding based on the category corresponding to the size when it is determined that any one of the process execution information of the first target object is object size data.

Referring now to FIG. 10B, object size data (width, height) may be categorized. A category may be generated by dividing it into a plurality of size sections having a range according to a criteria rule. For example, if the object size is 500 or less, it may be encoded as '10000.' For another example, if the object size is 3000 or more and less than 5000, it may be encoded as '00100.'

When the process execution information to be extracted is object path data (Target_ObjectPath), class type data or framework data that can be processed as categorical data included in the object path data that is selected, and it can be encoded in the form of multi-hot encoding. It will be described again with reference to FIG. 4.

Next, in step S150, the object classification model is learned and evaluated. The characteristic vector generated in step S140 may be used as learning and verification data of the object classification model. The ratio of the learning and verification data can be selected as 8:2, 7:3, etc. as in the normal machine learning process. Further, it is possible to solve the class imbalance problem by adjusting the data according to the distribution of detection criteria information according to the execution result.

Models used for object type classification can use machine learning models and deep learning models to solve multiple classification problems, such as support vector machines (SVM), random forests (RF), and deep neural network (DNN).

An ensemble classifier combining multiple models can also be used to improve classification performance.

For a specific example, when learning an object type classification model using a single neural network model, neurons constituting the neural network may be expressed as follows.

$$y = f\left(\sum_{i=1}^{l} w_i a_i + \sum_{j=1}^{m} w_j p_j + \sum_{k=1}^{n} w_k o_k + b\right)$$

where f is an activation function where various functions such as sigmoid, tank, and ReLU (i.e. rectified linear unit) can be applied, w is a weight for each characteristic and is optimized through a network learning process, b is a bias that is initialized and set for learning, a, p and o are user activity property information, application program property information, and target object property information extracted through step S130, respectively, and l, m, and n are the number of each extracted characteristics. During the supervised learning process, an object type classification model can be generated by tuning parameters for each model and verifying and evaluating model performance through engineering work.

Next, in step S160, an object classification model is output. As described with reference to FIG. 1, the output object classification model 400 may be transmitted to the object classification module 320 of the inference unit 300.

Next, in step S200, the object type is inferenced. Step S200 may be performed within inference unit 300 described with reference to FIG. 1. Hereinafter, steps within step S200 are described in order.

In step S210, input data is obtained. The input data at the time of driving may be a hot executable file. Further, at design time, input data may be step-by-step process execution information.

Next, in step S220, the input data is converted. The characteristic extraction of the preprocessing and process execution information described with reference to steps S120 and S140 is performed in the same way.

Next, in step S230, the object type probability is output. As described above, a probability value of belonging to an object type corresponding to process execution information is output. More specifically, an object type corresponding to process execution information included in input data is classified, and a probability value corresponding to detection criteria information for detecting the object type is output.

Next, in step S240, detection criteria information is set using a probability value.

The object detection method according to an embodiment of the inventive concept provides a method for efficiently detecting a target object on a user screen, and minimizes repetition of an unnecessary object detection process. Furthermore, by improving the success rate of object detection, it is possible to shorten the time for performing robot process automation technology.

Figure 2:
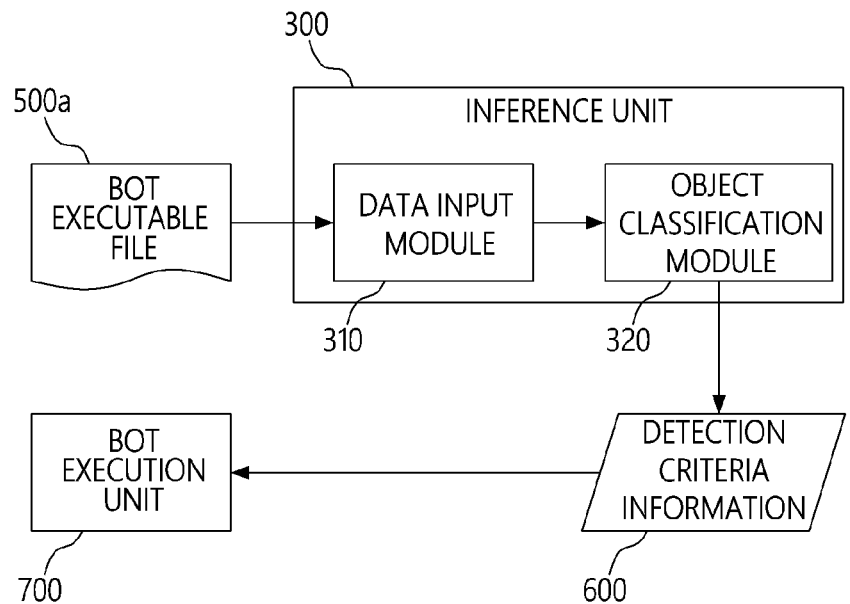
FIG. 2 is a diagram for describing in detail some configurations of the target object detection system described with reference to FIG. 1.

Hereinafter, an object detection method will be described with reference to FIGS. 2, 11 and 12 at the time of driving the hot. FIG. 2 is a diagram for describing in detail some configurations of the target object detection system described with reference to FIG. 1.

Referring to FIG. 2, the inference unit 300 described with reference to FIG. 1 is specified. The input data, at the time of driving the bot, may be a bot executable file 500a. The bot executable file 500a is transmitted to a computing device, on which the bot execution unit is installed according to the task allocation policy and schedule, and the bot execution unit can execute bot according to a predetermined task schedule. The rest of the configuration is the same as that described with reference to FIG. 1 and is therefore omitted.

Figure 11:
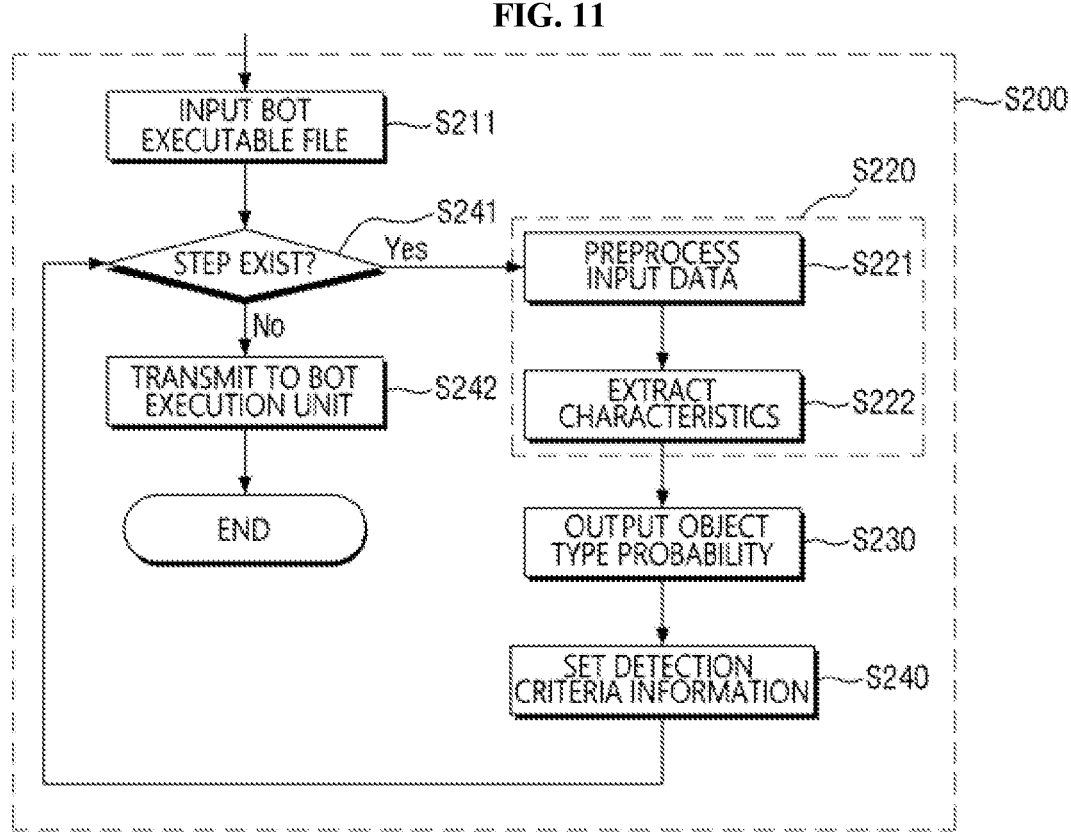
FIG. 11 is a flowchart for describing in detail some operations of the target object detection method described with reference to FIG. 4.

FIG. 11 is a flowchart for describing in detail some operations of the target object detection method described with reference to FIG. 4.

Referring to FIG. 11, in step S211, a bot executable file is input. If the step exists (S241), step S221 is then executed where the bot executable file, which is input data, is preprocessed. Next, in step S222, the characteristics of the process execution information included in the bot executable file, which is input data, are extracted. Next, in step S230, a probability value of belonging to the object type corresponding to the process execution information of the target object included in the input data is output. More specifically, the object type corresponding to the process execution information included in the input data is classified, and a probability value of corresponding to the detection criteria information for detecting the object type is output. Next, in step S240, a detection criteria information is set using the probability value. When the next step exists (S241), the same steps are repeated. When the next step does not exist (S241), the detection criteria information is transmitted to the bot execution unit in step S242.

Before executing the bot for the first time, the bot executable file is input to the inference unit 300 to extract step-by-step process execution information, and based on this, optimal step-by-step detection criteria information corresponding to the object type may be set.

For a detailed description of this, it will be described with reference to FIG. 12.

Figure 12:
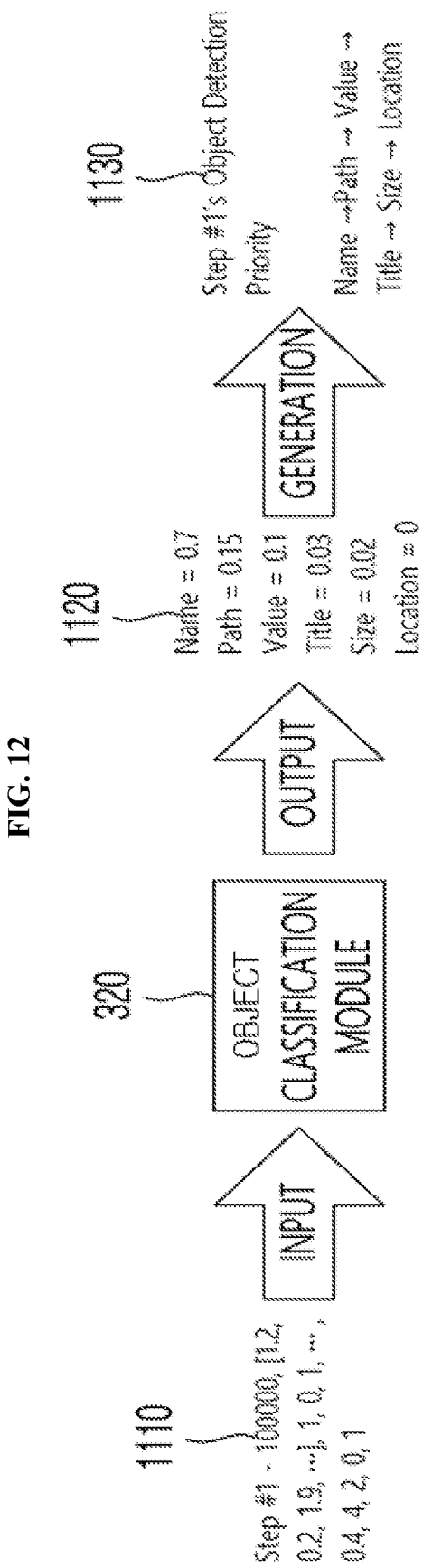
FIG. 12 is a diagram for describing in detail some operations of the target object detection method described with reference to FIGS. 2 and 11.

FIG. 12 is a diagram for describing in detail some operations of the target object detection method described with reference to FIGS. 2 and 11.

Referring to FIG. 12, input data 1110, which is preprocessed to extract characteristics, is input to the object classification module 320.

The object type corresponding to the process execution information included in the input data is classified, and a probability value 1120 corresponding to the detection criteria information for detecting the object type is output corresponding to the criteria item. For example, if the criteria item is 'Name,' the probability of detecting the object type in this example is 0.7. For another example, if the criteria item is 'Path,' the probability of detecting the object type in this example is 0.15. As another example, when the criteria item is 'Location,' the probability of detecting the object type in this example is 0.

Using the output probability value, the detection criteria information 1130 is set. For example, the detection criteria information may be set in the illustrated order, such as 'Name,' 'Path,' and 'Value' corresponding to a criteria item having a high probability. However, it is not limited to this example.

Figure 3:
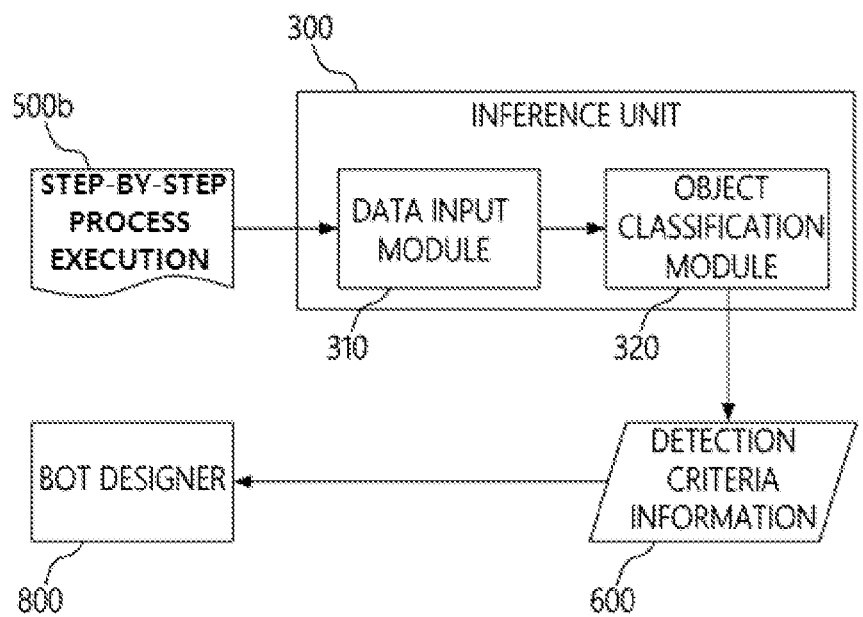
FIG. 3 is a diagram for describing in more detail some configurations of the target object detection system described with reference to FIG. 1.

Hereinafter, an object detection method at the time of bot design will be described with reference to FIGS. 3, 13 and 14. FIG. 3 is a diagram for describing in more detail some configurations of the target object detection system described with reference to FIG. 1.

Referring to FIG. 3, the inference unit 300 described with reference to FIG. 1 is specified. At the time of designing the bot, the input data may be step-by-step process execution information 500b. The step-by-step process execution information 500b may be input by a robot process automation design tool in the bot designer 800. The rest of the configuration is the same as that described with reference to FIG. 1 and is therefore omitted.

Figure 13:
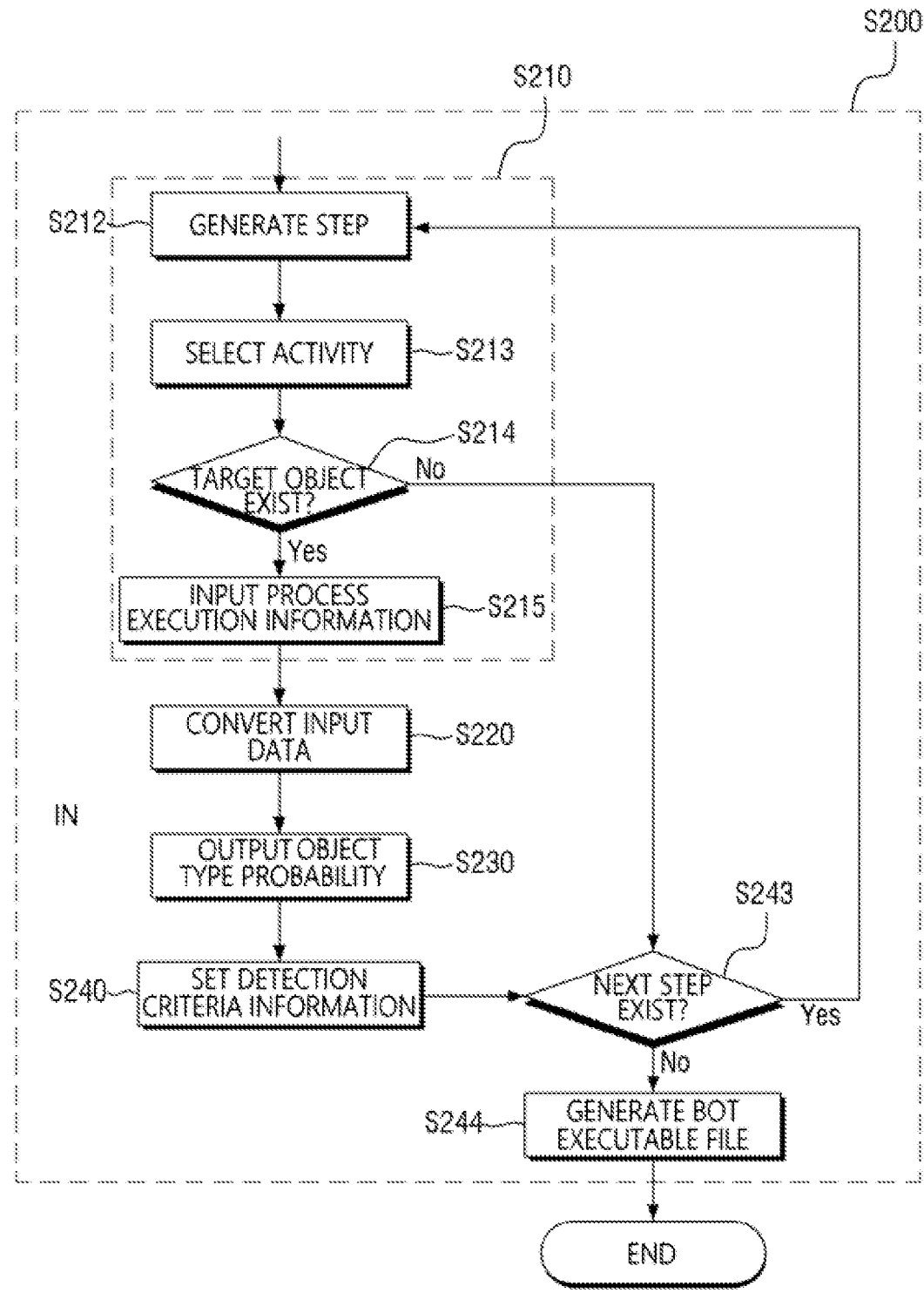
FIG. 13 is a flowchart for describing in detail some operations of the target object detection method described with reference to FIG. 4.

FIG. 13 is a flowchart for describing in detail some operations of the target object detection method described with reference to FIG. 4.

Referring to FIG. 13, a step is generated in step S212. Next, in step S213, a user activity is selected. When the target object exists (S214), the process execution information is input in step S215. Next, in step S220, step-by-step process property information that is input data is converted. Next, in step S230, the object type probability is calculated and output. Next, in step S240, detection criteria information is set. When the next step exists (S243), the above-described operations are repeated. If the next step does not exist (S243), the bot executable file is generated in step S244.

In the bot design step, the bot designer 800 may set the detection criteria items based on the received detection criteria information or the detection criteria information may be automatically set without bot designer intervention. The method described with reference to FIG. 13 is repeatedly performed until the bot designer 800 finishes designing the process and finishes generating the bot executable file. Through the inference method described with reference to FIG. 13, detection criteria information having a high success probability of detection may be set.

For a detailed description of this, it will be described with reference to FIG. 14.

Figure 14:
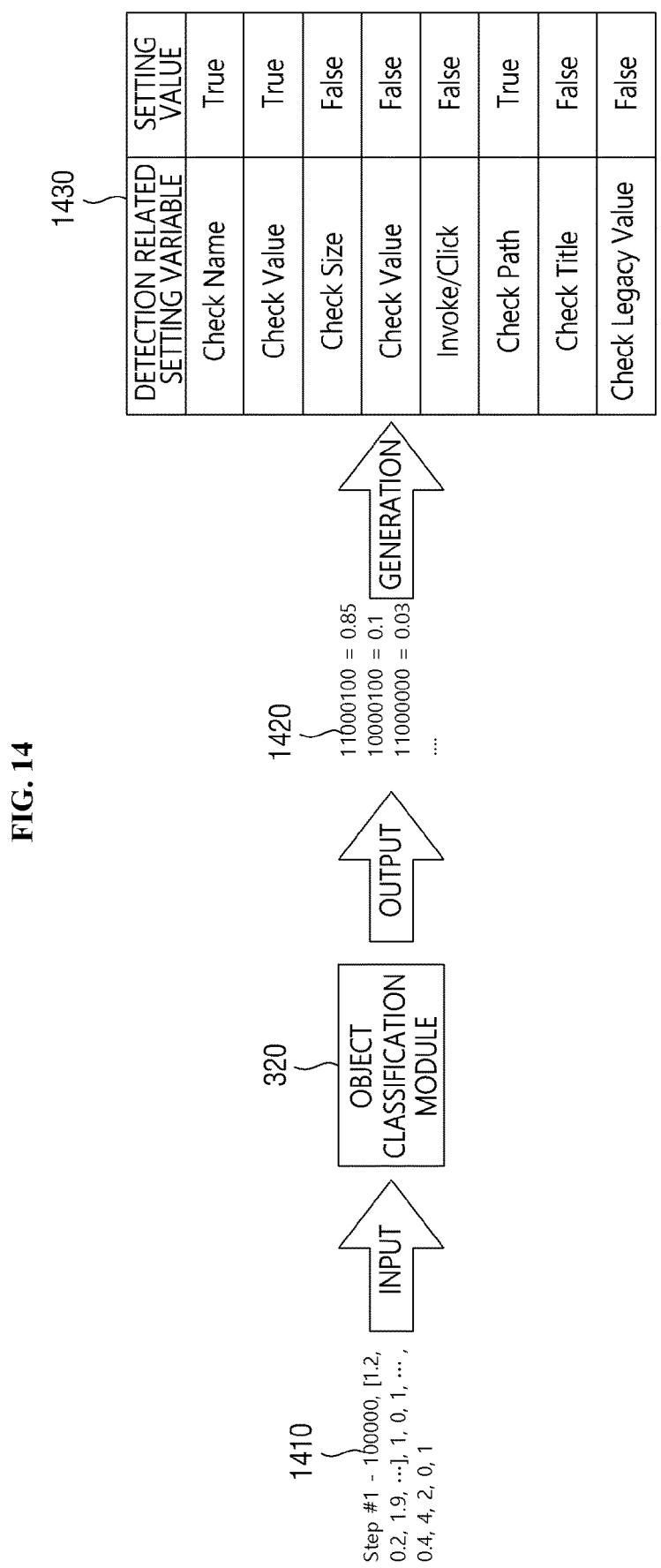
FIG. 14 is a diagram for describing in detail some operations of the target object detection method described with reference to FIGS. 3 and 13.

FIG. 14 is a diagram for describing in detail some operations of the target object detection method described with reference to FIGS. 3 and 13.

Referring to FIG. 14, input data 1410, which is preprocessed to extract the characteristics, is input to the object classification module 320.

The object type corresponding to the process execution information included in the input data is classified, and a probability value 1420 corresponding to the detection criteria information for detecting the object type is output corresponding to the detection criteria information. For example, the probability of detecting the object type in this example by using the detection criteria information '11000100' is 0.85. For another example, the probability of detecting the object type in this example by using the detection criteria information of '10000100' is 0.1.

Detection criteria information 1430 is set using the output probability value. For example, the detection criteria information that is '1100010' having the highest probability value 1420 is a detection criterion for checking 'Name,' 'Value,' and 'Path.' The object type of the present example can be detected by using the set detection criteria.

The object detection method according to an embodiment of the inventive concept may provide detection criteria for dynamically detecting a target object.

Hereinafter, an exemplary computing device 1500 that can implement an apparatus and a system, according to various embodiments of the present disclosure will be described with reference to FIG. 15.

Figure 15:
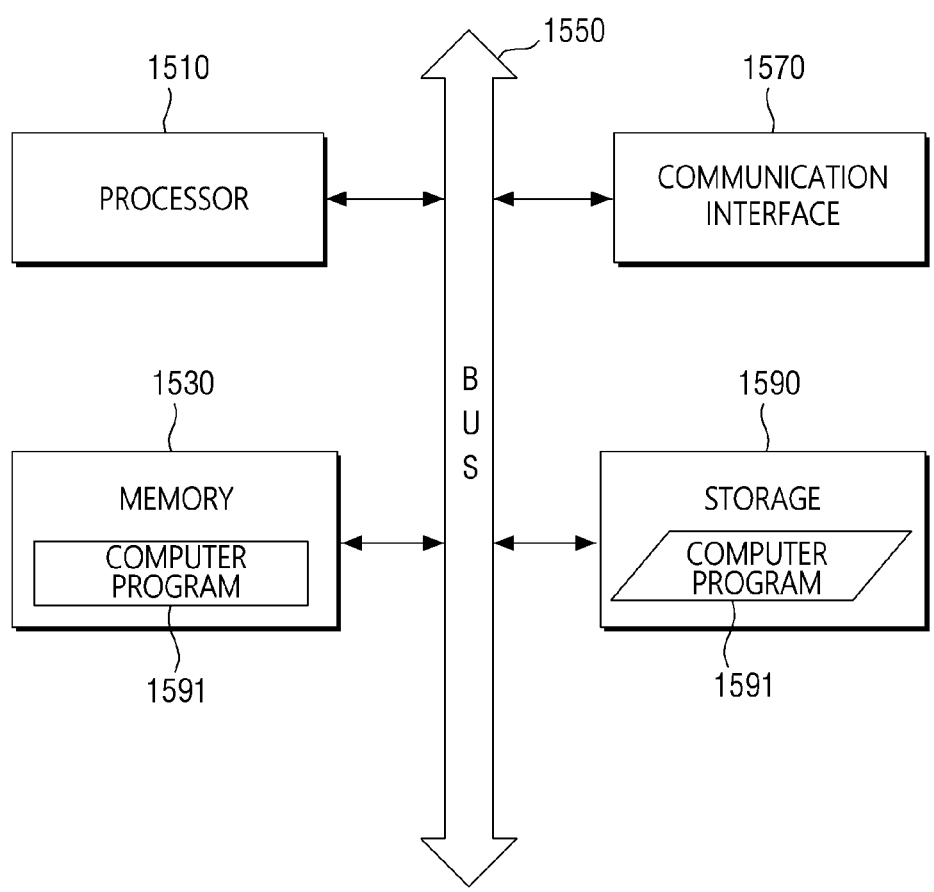
FIG. 15 is a diagram for describing a computing device capable of implementing a target object detection device according to an embodiment of the inventive concept.

FIG. 15 is an example hardware diagram illustrating a computing device 1500.

As shown in FIG. 15, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 15 illustrates only the components related to the embodiment of the present disclosure. Therefore, it will be appreciated by those skilled in the art that the present disclosure may further include other general purpose components in addition to the components shown in FIG. 15.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 4 may be implemented on the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless Internet communication of the computing device 1500. The communication interface 1570 may support various communication methods other than Internet communication. To this end, the communication interface 1570 may be configured to include a communication module well known in the art of the present disclosure.

The storage 1590 can non-temporarily (i.e. retains data and information when there is a power interruption) store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded into the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A target object detection method performed by a computing device, comprising:
    detecting a first target object on a screen and obtaining a bot executable file to perform a defined operation for the first target object;
    labelling an object type classification criterion for the first target object by encoding detection criterion information of the first target object included in the bot executable file;
    extracting a characteristic of process execution information of the first target object included in the bot executable file; and
    generating an object classification model that outputs data on an object type corresponding to the process execution information by performing machine learning using the object type classification criterion and the characteristic of process execution information of the first target object included in the bot executable file.

2. The target object detection method of claim 1, further comprising preprocessing the bot executable file.

3. The target object detection method of claim 2, wherein the preprocessing comprises assigning a default value to the process execution information in which a missing value is generated when it is determined that the missing value is generated in any one of the process execution information of the first target object.

4. The target object detection method of claim 2, wherein the preprocessing comprises removing at least one of the process execution information of the first target object according to a criteria rule.

5. The target object detection method of claim 1, wherein:
    the detection criterion information of the first target object is information in which at least two or more of a plurality of detection criteria items are selected; and
    the labelling of the object type classification criterion includes automatically labelling the object type classification criterion by multi-hot encoding the selected detection criteria items.

6. The target object detection method of claim 1, wherein:
    the detection criterion information of the first target object is information in which one of a plurality of detection criteria items is selected; and
    the labelling of the object type classification criterion includes automatically labelling the object type classification criterion by label-encoding the selected detection criteria item.

7. The target object detection method of claim 1, wherein:
    the process execution information of the first target object includes at least one of user activity property information, target application property information and target object property information; and
    the extracting of the characteristic includes generating a characteristic vector including the process execution information of the first target object.

8. The target object detection method of claim 1, wherein the extracting of the characteristic comprises encoding based on a category corresponding to text when it is determined that any one of the process execution information of the first target object is categorical text data.

9. The target object detection method of claim 1, wherein the extracting of the characteristic comprises:
    generating a category according to a criteria rule when it is determined that any one of the process execution information of the first target object is other than categorical text data; and
    extracting the characteristic by encoding based on the category.

10. The target object detection method of claim 9, wherein the generating of the category according to the criteria rule comprises:
    obtaining a plurality of execution logs generated in a process of detecting a target object on the screen and performing a defined operation; and
    generating the category based on a keyword obtained above a reference value in text of the process execution information by using the process execution information of the target object included in the plurality of execution logs; and
    wherein the extracting of the characteristic comprises encoding based on the category corresponding to the keyword included in the text of the first target object.

11. The target object detection method of claim 10, wherein:
    the generating of the category based on the keyword obtained above the reference value includes generating a first category absent of the keyword; and
    the extracting of the characteristic includes encoding based on the first category when it is determined that the keyword is not included in the text of the first target object.

12. The target object detection method of claim 9, the generating of the category according to the criteria rule comprises:
    converting the text into a regular expression pattern; and
    generating the category based on a similarity of the regular expression pattern.

13. The target object detection method of claim 1, wherein the extracting of the characteristic comprises:

generating a category by dividing the screen when it is determined that any one of the process execution information of the first target object is location coordinates data, the category being based on location coordinates included in the divided screen; and encoding based on the category corresponding to the location coordinates.

14. The target object detection method of claim 1, wherein the extracting of the characteristic comprises:

generating a category by dividing object size data into a plurality of size sections having a range according to a criteria rule when it is determined that any one of the process execution information of the first target object is the object size data; and encoding based on the category.

15. The target object detection method of claim 1, further comprising:

obtaining input data including a process execution information of a target object;

converting the input data; and outputting a probability value for an object type corresponding to the process execution information of the target object included in the converted input data by inputting the converted input data to the generated object classification model.

16. The target object detection method of claim 15 further comprising setting detection criterion information using the probability value.

17. The target object detection method of claim 1, the bot executable file to:

detect the first target object on a plurality of step-by-step screens; and perform the defined operation.

18. A target object detection method performed by a computing device comprising:

detecting a first target object on a screen and obtaining an execution log generated by a process of performing a defined operation;

labelling object type classification criterion by encoding detection criterion information of the first target object included in the execution log;

extracting a characteristic of process execution information of the first target object included in the execution log; and generating an object classification model that outputs data on an object type corresponding to the process execution information of the first target object by performing machine learning using the object type classification criterion and the characteristic of process execution information of the first target object included in the bot executable file.

19. The target object detection method of claim 18, wherein:

the detection criterion information being a detection criteria item included in a detection success history of the first target object; and the labelling the object type classification criterion includes automatically labelling the object type classification criterion by encoding the detection criteria item.

20. A target object detection apparatus, comprising:

a processor;

a network interface;

a memory; and a computer program loaded within the memory and executed by the processor, wherein the computer program comprises:

an instruction to detect a first target object on a screen and obtain a bot executable file to perform a defined operation for the first target object;

an instruction to label an object type classification criterion for the first target object by encoding the detection criterion information of the first target object included in the bot executable file;

an instruction to extract a characteristic of process execution information of the first target object included in the bot executable file; and an instruction to generate an object classification model that outputs data on an object type corresponding to the process execution information by performing machine learning using the object type classification criterion and the characteristic of process execution information of the first target object included in the bot executable file.

* * * * *